Inventor
Richard Hervig
by T. H. Gibbs
his Atty.

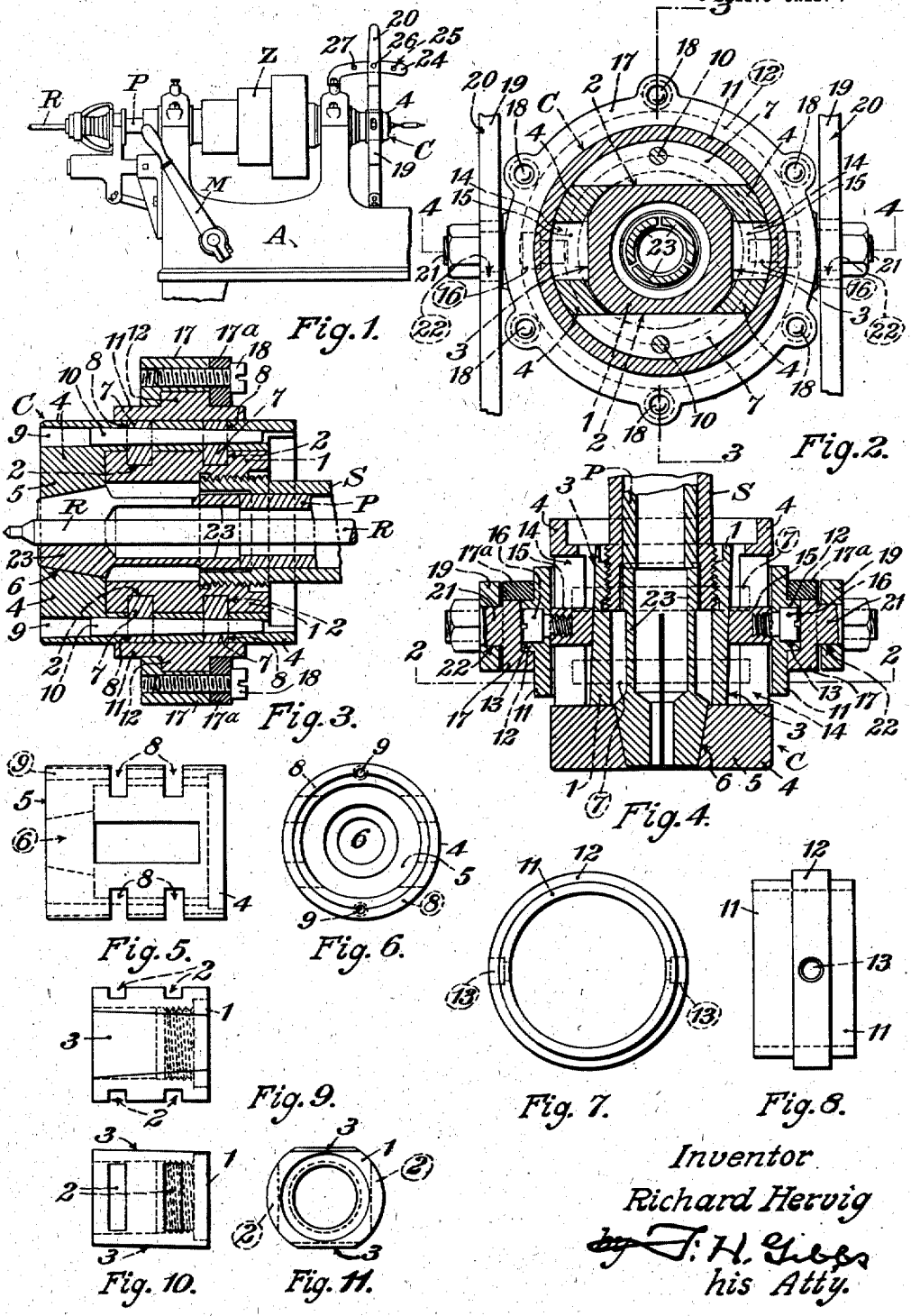

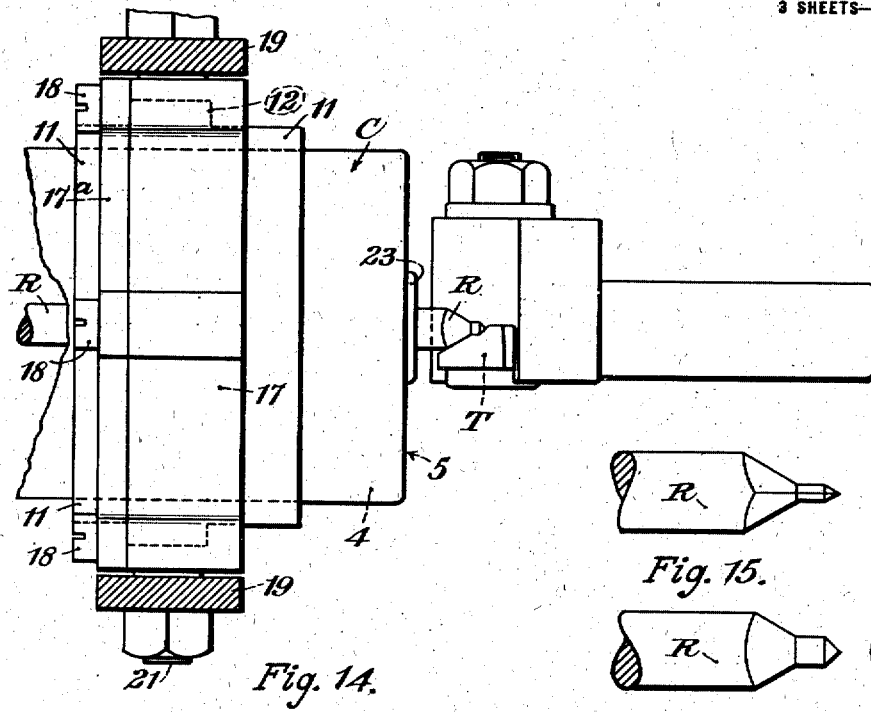

UNITED STATES PATENT OFFICE.

RICHARD HERVIG, OF CHICAGO, ILLINOIS, ASSIGNOR TO AMERICAN CAR AND FOUNDRY COMPANY, OF ST. LOUIS, MISSOURI, A CORPORATION OF NEW JERSEY.

LATHE ATTACHMENT.

1,256,131.       Specification of Letters Patent.     Patented Feb. 12, 1918.

Application filed July 19, 1917. Serial No. 181,550.

*To all whom it may concern:*

Be it known that I, RICHARD HERVIG, residing at Chicago, Illinois, and being a subject of the King of Norway, have invented certain new and useful Improvements in Lathe Attachments, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, and it is obvious that various modifications thereof within the scope of the claims will occur to persons skilled in the art.

In said drawings:

Figure 1 is a side elevation of a portion of the lathe showing my improved attachment for turning work off center applied thereto;

Fig. 2 is a transverse section through the chuck, being taken on the line 2—2 of Fig. 4 and showing the chuck connected with the spaced lever arms;

Fig. 3 is another section through the chuck taken on line 3—3 of Fig. 2 and parallel with the direction of the chuck axis;

Fig. 4 is a similar section taken at right angles to the section of Fig. 3 and on the line 4—4 of Fig. 2;

Fig. 5 is a side elevation on a smaller scale of an outer cylindrical member of the chuck, showing its various slots and keyways;

Fig. 6 is an elevation of the right hand end of the cylindrical member of Fig. 5;

Fig. 7 is an elevational view of the annulus slidable on the cylindrical member of Figs. 5 and 6;

Fig. 8 is another elevational view thereof at right angles to Fig. 7;

Fig. 9 is a side elevation of a relatively inner tubular member adapted to be incased by the cylindrical member of Fig. 5, and illustrates the keyways and guideways formed therein;

Fig. 10 is another similar view taken at right angles to Fig. 9 with the axis of the tubular member lying in the same direction;

Fig. 11 is an end elevation of the tubular member of Figs. 9 and 10;

Fig. 14 shows a view wherein the tool has just finished a cutting operation on the work;

Figs. 15, 16 and 17 represent side, plan and end views of the finished product; and Figs. 18 to 25 inclusive diagrammatically illustrate, in quarter turns, the different positions assumed by the work in relation to the tool while the work is rotating in eccentric positions.

Figure 12:
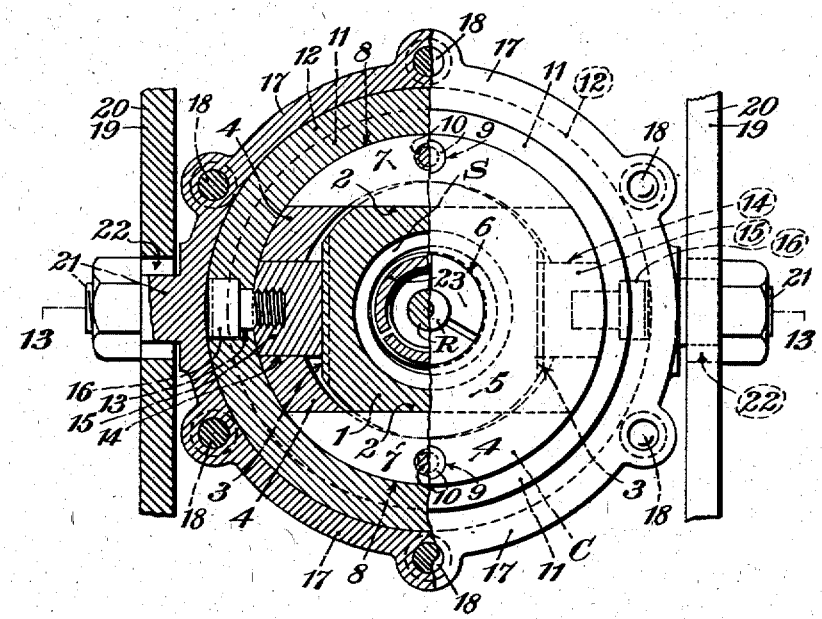
Fig. 12 is a view somewhat similar to Fig. 2, one-half thereof being in section and the other half showing the assembled chuck in end elevation, said figure being taken on the line 12—12 of Fig. 13.

This invention relates to mechanism, one of the purposes of which is to cut rotating work to give it a substantially oval or elliptical cross section. It is proposed to use the invention as an attachment to a lathe, but it should be clearly understood that it is not limited to association with a lathe alone, as it may be advantageously used in connection with boring machines and other devices.

A peculiarly constructed chuck is employed that includes a holder and a rotatable member adapted to revolve such holder. The rotatable member is arranged to maintain the holder concentric to the driving spindle, when so desired, but is adapted to be shifted transversely of the chuck to eccentrically position the axis of the holder at either side of the spindle axis.

In coöperation with the rotatable member, the holder is adapted to grip work, which may extend through and beyond such holder to be subjected to cutting treatment by an appropriate tool. Because of the construction, the work may be in lengths representing multiples of the finished product, and may be fed through the chuck, each multiple portion thereof being held in successive order for treatment, after which the portion may be cut off.

As the holder and work gripped by it may be shifted to and eccentrically held at either side of the axis of the spindle, the work may be cut by the tool for only half of its circumferential surface, leaving the remaining half of said surface in its original condition. Also, the holder may be transferred from the eccentric position at one side of the spindle axis to a diametrically opposite position on the other side thereof, and both sides of the work may be cut to give the work a substantially elliptical cross section.

Instead of retaining work, the holder may grip a tool to be used for eccentric cutting, under which circumstances it will be useful when employed with a lathe or with a boring machine.

Various other features of novelty and utility will become apparent hereinafter, and, of course, are to be considered as coming within the scope of the present invention.

Referring to the drawings, A represents in side elevation an end portion of a lathe to which my attachment is applied. A chuck C is applied to the lathe spindle, which spindle is not shown in Fig. 1, the chuck-receiving portion of said spindle S being illustrated in Figs. 3, 4 and 13.

The chuck proper is provided with an inner tubular member 1 internally threaded for attachment to the spindle S, and provided in its circumferential surface with spaced recesses or keyways 2, and with diametrically opposed longitudinal guideways 3, disposed angularly to the axis of member 1, as shown in Figs. 9 to 11 inclusive. Said member 1 is positioned within a relatively outer cylindrical member 4, shown in detail in Figs. 5 and 6. The member 4 comprises a shell open at one end and provided at its other end with an end wall 5 containing a tapered aperture 6 centrally thereof. The shell of member 4 is outwardly cylindrical, but internally is eccentric to the axis of member 4 in two directions, whereby the inner surface of the shell of member 4 contacts only with diametrically opposite arcuate portions of member 1, member 4 being, therefore, displaceable in opposite directions transversely of inner tubular member 1.

Inner tubular member 1 and relatively outer cylindrical member 4 are connected by keys 7, each of which in side elevation appears as the segment of a circle. As shown, two such keys 7 are employed at each side of the chuck C. Keys 7 are driven through longitudinally spaced slots 8 through opposite sides of cylindrical member 4, being pushed therethrough to enter the recesses or keyways 2 in the inner tubular member 1. Each key is provided with a dowel pin hole which is brought into register with other dowel pin holes 9 passing longitudinally through the shell of outer cylindrical member 4. Dowel pins 10 are driven through the holes 9 of cylindrical member 4, and the holes in the segmentally shaped keys 7. When the dowel pins 10 are finally positioned, the arcuate surfaces of keys 7 continue the cylindrical surface of member 4 throughout the lengths of the slots 8, and pins 10 rigidly hold keys 7 in the positions indicated.

When members 1 and 4 are so keyed together, they are held against relative longitudinal movement, as will be appreciated from Fig. 3. Also, the faces of keys 7 which form the chords of the segments created by the shape of said keys, constitute guideways or tracks bearing on the flat bottoms of recesses or keyways 2 in the inner tubular member 1. As outer cylindrical member 4 loosely surrounds the inner tubular member 1, this arrangement of the keys allows the cylindrical member 4 to be guidedly slid transversely of the chuck and its inner tubular member 1. It will also be seen that the guiding surfaces or track portions of the keys 7 are rotated by the inner tubular member 1 and the keys in turn rotate the outer cylindrical member 4.

Surrounding outer cylindrical member 4, and slidable longitudinally thereof, is an annulus 11. On its outer surface annulus 11 is provided with an annular projection 12, later referred to. Diametrically opposed countersunk holes 13 pass through sliding annulus 11, receiving therein countersunk screws 16, which project into slots 14 in the shell of cylindrical member 4, which slots are diametrically opposed and extend longitudinally of said member 4.

Before annulus 11 is slipped over outer cylindrical member 4, guide blocks 15 are positioned within slots 14 of said member 4. Said guide blocks bear against the angularly disposed guideways 3 of inner tubular member 1 and are adapted to slide longitudinally thereof. They also are provided with threaded holes into which the screws 16 are threaded. Therefore guide blocks 15 are affixed to and substantially constitute extensions of the sliding annulus 11.

A divisible coupling ring comprising a pair of annular portions 17 and 17ª, united by a set of circumferentially distributed screws 18, connects the sliding annulus 11 with the spaced arms 19 of a lever 20, hereafter referred to. It is immaterial exactly how the ring 17—17ª is divided, but a good method is shown in the drawings wherein the part 17 is recessed and the complementary portion 17ª is a plain ring screwed to part 17 forming an annular recess in which is seated the annular external extension of the sliding annulus 11. Annulus 11 and divisible ring 17—17ª are so connected that the chuck and annulus 11 may rotate readily without causing rotation of the divisible ring, which acts much like an eccentric strap about an eccentric and is provided to shift annulus 11 longitudinally of the axis of the cylindrical member 4. Projecting from the divisible ring 17—17ª in opposite directions on the same diametrical line, are trunnions 21 which project through slots 22 in the spaced arms 19 of lever 20, suitable nuts being threaded onto the ends of trunnions 21, thereby retaining the lever arms 19 between said nuts and the divisible ring.

Positioned within the relatively inner tubular member 1, is a collet or holder 23 which is movable longitudinally of the axis of the chuck and also transversely thereof to an appropriate degree for a purpose later explained. The outer end of holder or collet 23 is tapered to correspond substantially to the taper of the wall of the hole 6 in the end 5 of outer cylindrical member 4, and is provided with one or more slots, whereby said outer end of holder 23 is compressible.

Before the trunnions 21 of the divisible ring 17—17ª are seated in the slots 22, the chuck C is in condition for attachment to the threaded end of spindle S.

Previously to attaching chuck C to spindle S, the holder 23 is rather forcibly pushed into the tapered hole 6 in the wall 5 of cylindrical member 4 to temporarily unify it therewith. Thereafter the lever M, shown in Fig. 1, is thrown to the left, and through mechanism well understood in the lathe art, a plunger P is retracted by being moved also to the left. This having been done, the inner tubular member 1 is screwed onto the end of spindle S, after which work, such as a drill rod R, is passed from the left in Fig. 1 through the tubular plunger P and tubular holder 23, the latter having been pushed inwardly to allow it to expand. Lever M of Fig. 1 is then thrown to the right, whereupon plunger P moves toward the outer end of the chuck, forcing holder 23 into the tapered hole 6 in wall 5 of cylindrical member 4, the outer end of said holder 23 being thereby compressed to tightly grip the work.

If power now be applied to the lathe pulley Z, the spindle S will be caused to rotate, rotating the chuck C and the work R.

If lever 20, best shown in Fig. 1, is in its central position, the guide blocks 15 will be in their neutral positions, midway the lengths of guideways 3, and, therefore, the axis of the holder and cylindrical member 4 will be coincident with the axis of the lathe spindle, and consequently the work will be rotated on the true center of the lathe. A tool T, such as is shown in Fig. 14, may then be driven transversely of the work R to engage the outer surface thereof, and will, under these conditions, cut the work in a concentric manner.

If it be desired to produce an elliptical cross section, by the use of tool T, in the rod R to produce such a product as is shown in Figs. 15 to 17 inclusive, the following operations will take place:

The lever 20 will be moved from its central position as shown in Fig. 1 to the right along a sector 24 secured to a bearing pedestal of the lathe until the hole in lever 20 registers with hole 25 in sector 24, pin 26 or other device passing through the lever 20 and sector 24 to lock lever 20 in its right hand position. In so moving lever 20, its arms 19 through trunnions 21 shift the divisible ring 17—17ª and annulus 11 in the same direction. Guide blocks 15 traverse the inclined guideways or faces 3 of member 1 in moving toward the outer end of the chuck.

Figure 13:
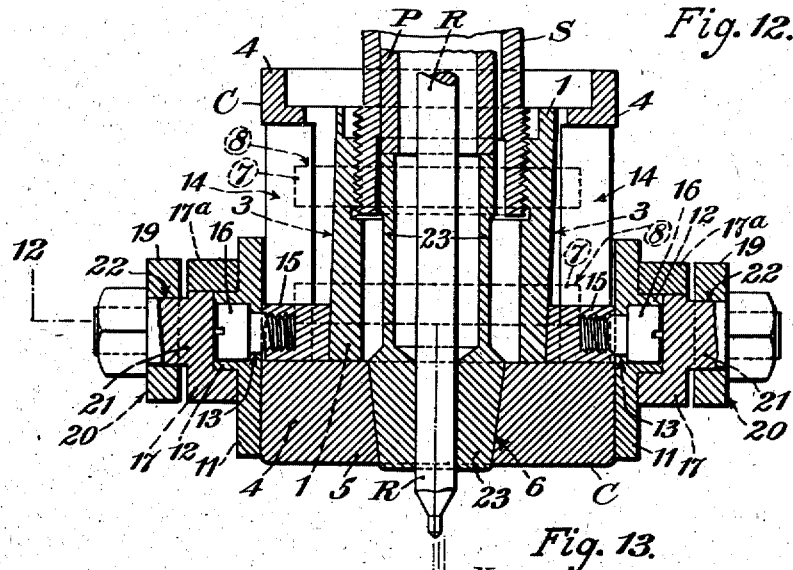
Fig. 13 is a horizontal section taken on the line 13—13 of Fig. 12 and showing the axis of the holder and work eccentrically disposed to the axis of the chuck driving spindle.

The outer cylindrical member 4 and holder 23 will therefore be moved to the left as shown in Figs. 12 and 13. The inner end of holder 23 floats within the tubular spindle S, there being sufficient clearance to permit the eccentric positioning of the holder, as just indicated.

The spindle S may now be rotated and the tool T advanced to engage the outer surface of the work.

What transpires thereafter will best be understood by reference to the diagrammatic Figs. 18 to 21 inclusive in which the full lines represent the actual metal present; the space between the full lines and the dotted lines within the full lines representing the metal to be removed; and the space between the full lines and the dotted lines outside the full lines denoting the metal cut away. The crosses represent the position of the axis of the spindle S and the point O denotes the original center of the work. The point O is offset from the spindle axis a distance equal to the eccentricity between the axis of the spindle and the holder in its eccentric position. Let O' represent a point on the outer surface of the work opposite the center O of the work. For convenience the various stages of the operation are shown in quarter turn steps, but the operation is continuous, there being no necessity to stop the machine for adjustment when the work is shifted from one position to another. Fig. 18 shows the work in contact with the tool T and about to revolve for a quarter turn. As the keys 7 cause members 1 and 4 to rotate as a unit about the spindle axis, member 4 acts in effect as an eccentric on said spindle, and with annulus 11 member 4 revolves about its own axis, in divisible ring 17—17ª. As the work turns points O and O' approach the point of tool T. At the end of the quarter turn, points O and O' are positioned as indicated in Fig. 19 and the metal between the dotted and full lines has been removed. Progressing for another quarter turn without stop points O and O' travel concentrically about the centers of the spindle and the work, respectively, until they reach the positions shown in Fig. 20, and having arrived at these locations it will be found that half of the rod has been cut away as indicated between the full and dotted lines.

Another point K' on the uncut portion of the circumference of the work will, through the next quarter turn, move toward the tool T and when it comes opposite to said tool T will be found to be spaced inwardly therefrom a distance equal to the degree of eccentricity between the spindle axis and the axis of the work. This position of point K' is indicated in Fig. 21, in which figure the original axis of the work is shown to have been returned to the true center of the lathe, which was accomplished by shifting lever 20 to its central position without stopping the machine, and the tool T is therefore caused to again contact with the work, but is not in position to remove any metal, all of the possible cutting on one side of the work having been performed. The lever 20, as shown in Fig. 1, is now moved without interrupting the lathe operation to the left to have the hole therein register with sector hole 27, pin 26 being again used to hold lever 20 in this latest position. As before, the guide blocks 15 will slide along the inclined ways or faces of inner member 1, but this time toward the rear of chuck C, shifting annulus 11, and therefore cylindrical member 4 and holder 23. The axis of the work, and hence holder 23 and cylindrical member 4, is consequently shifted, as shown in Fig. 13, to the opposite side of the lathe axis X to be eccentrically disposed at Y', substantially as it was first positioned at Y.

Continued rotation of holder 23 by member 4, which is driven by inner tubular member 1 secured to spindle S, causes the work R to rotate in the same direction as it previously did. Fig. 22 shows the tool about to begin cutting the hitherto uncut half of the work. The successive steps are shown in Figs. 22 to 25 inclusive and are similar to those illustrated in Figs. 18 to 21 inclusive.

In Figs. 22 to 25 inclusive, the original center O of the work, though now shifted to the opposite side of the spindle axis, is rotated about the same path concentric to the spindle axis. Point K' is positioned on the periphery of said work in a position corresponding to O' in Figs. 18 to 21, but diametrically opposite to O'. Points O and K' move in the same relation to the tool T as did points O and O' when the opposite side of the work was being cut, and, after the successive quarter turns, are positioned as shown in Fig. 25. The part of the work that has been cut by the tool will then be found to be substantially elliptical, and in cross section is possessed of points N and J just adapted to touch the nose of tool T during continued rotation, when point O has been once more returned to coincide with the axis of the spindle, points O'' and K'' clearing the point of the tool.

It is obvious that the attachment may be used in other ways, and that instead of gripping work the holder 23 may retain a tool. Such a tool so gripped by holder 23 may be used in eccentrically cutting the end of work set up in a lathe, or a tool for a boring machine may have its stem held by holder 23.

What I claim is:

1. In combination in mechanism of the character described, a revoluble spindle, a chuck comprising members connected for rotation by said spindle one being displaceable eccentrically thereof, a holder rotatable about the spindle axis by said displaceable member, and means movable axially of the latter member to shift the same and said holder transversely of said spindle.

2. In combination in mechanism of the character described, a rotatable spindle and a holder connected for simultaneous rotation, said holder being movable to positions concentric and eccentric to said spindle, and means movable axially of the holder axis for selectively so moving said holder adapted to hold the same in the selected position.

3. In combination in mechanism of the character described, a rotatable spindle, a chuck driven thereby comprising a member movable to be concentric or eccentric to said spindle and provided with an opening in a portion of itself, a floating compressible holder in said member, and means movable to drive said holder into the opening in said member, whereby the wall of the opening causes said holder to grip an object.

4. In combination in mechanism of the character described, a rotatable spindle and a chuck comprising an inner member secured to said spindle, an outer member rotatively driven by the inner member and mounted to slide transversely thereof, a holder rotatable by said outer member, and means movable longitudinally of said chuck to shift said outer member and holder transversely of said spindle.

5. In combination in mechanism of the character described, a rotatable spindle and a chuck comprising inner and outer members and a holder, said spindle and inner member having a common axis and said outer member and holder having another common axis, and means co-acting with and movable axially of said inner and outer members to bring said axes into and out of coincidence.

6. In combination in mechanism of the character described, a spindle, and a chuck comprising a spindle-rotated inner member with longitudinal portions angularly disposed to the spindle axis, an outer member rotatable by and transversely displaceable of said inner member, a holder movable therewith, and a device slidable longitudinally of said outer member provided with extensions adapted to co-act with the angularly disposed portions of said inner member to shift said outer member.

7. The combination with a rotatable spindle, of a chuck comprising inner and outer members connected for rotation by said spindle and held against relative longitudinal movement, said outer member being transversely displaceable and said inner member having longitudinal ways inclined to the spindle axis, a holder displaceable with said outer member, and a device embracingly holding said outer member and slidable in engagement with said ways to be displaced and to displace said outer member.

8. In combination in a chuck, a rotatable inner member, an outer member rotatable thereby displaceable transversely but not longitudinally thereof, a holder movable into engagement with said outer member to be rotated therewith, and a device embracing said outer member and held to slide on both members and angularly to the axis of the chuck to displace said outer member and holder.

9. In combination in a mechanism of the character described, a rotatable spindle, and a chuck comprising an inner member rotatable by and about the axis of said spindle, an outer transversely displaceable member driven by said inner member, a holder adapted to float with respect to said spindle and inner member and rotatable about the spindle axis by said outer member, said holder and outer member having a common axis which is transferable to opposite sides of the spindle axis.

10. In combination in a mechanism of the character described, a rotatable spindle, a chuck comprising an inner member rotatable by and about the axis of said spindle, an outer transversely displaceable member driven by said inner member, a holder adapted to float with respect to said spindle and inner member, said holder and outer member having an axis common to both, which axis is rotatable about and transferable to opposite sides of the spindle axis, and means maintaining said outer member and said holder concentric or eccentric to said spindle at will.

11. In combination in mechanism of the character described, a tubular spindle, a plunger movable longitudinally therein, a hollow spindle-rotated member, another member adapted to be driven thereby displaceable to either side of the spindle and provided with a hole through its wall, and a compressible holder adapted to be driven by said plunger against the wall of the hole to grip an object and to have its axis rotated about the spindle axis when it is eccentric thereto.

12. In combination in mechanism of the character described, a spindle, a chuck adapted to be rotated thereby comprising a member and a holder rotatable about a common axis, a device movable longitudinally of the chuck to move said member and holder transversely thereof, and means with which said device is adapted to be interlocked at various locations to dispose the common axis of said member and holder concentric to the spindle axis or eccentrically at either side thereof.

13. In combination in mechanism of the character described, a tubular spindle, a tubular plunger longitudinally movable therein, a plurality of connected members rotatable by said spindle one member being transversely displaceable and having a hole therethrough, and a tubular slitted holder adapted to float transversely of said spindle, work being adapted to pass through said plunger and holder, said plunger being adapted to drive said holder against the wall of the hole to cause it to grip work.

14. In combination in a chuck, a tubular member for attachment to rotary driving means, a cylindrical member incasing and transversely displaceable of said tubular member, keys uniting both members on which said cylindrical member is slidable, and a holder rotatable with said latter member.

15. In combination in a chuck, a circumferentially recessed tubular member for attachment to rotary driving means, a circumferentially slotted cylindrical member increasing said tubular member, keys seated in the recesses and slots of said members and conformed to the outer surface of said cylindrical member, the latter being slidable on said keys transversely of said tubular member, means locking said keys to said tubular member and a holder rotatable with said cylindrical member.

16. In combination in a chuck, a rotary member adapted to be driven and provided with parallel sides inclined to its axis, a member outwardly cylindrical loosely surrounding the first member and provided with longitudinal slots, a holder rotatable thereby, a device conformed to and slidable longitudinally of the circumferential portion of said cylindrical member and having extensions displaceable by said inclined parallel sides to eccentrically displace said cylindrical member and holder.

17. In combination in a chuck, a rotary member adapted to be driven and provided with parallel sides inclined to its axis, a member outwardly cylindrical loosely surrounding the first member and provided with longitudinal slots, a holder rotatable thereby, a device conformed to and slidable longitudinally of the circumferential portion of said cylindrical member and having extensions adapted to be moved along said inclined parallel sides to position said cylindrical member and holder concentrically and eccentrically of the first member.

18. In combination in a chuck, a rotary member provided with parallel sides inclined to its axis, an outwardly cylindrical member loosely surrounding the first member and provided with longitudinal slots, a holder rotatable thereby, an annulus about and slidable longitudinally of the circumference of said cylindrical member, and guides secured thereto passing through said slots and adapted to move along said inclined parallel sides to laterally shift said annulus and cylindrical member.

19. A chuck comprising a rotary member having inclined ways, an outwardly cylindrical slotted member incasing the same and rotatable thereby, a holder rotatable thereby, an annulus surrounding said cylindrical member and provided with guides adapted to move along said inclined ways, a divisible ring holding said annulus and having trunnions, in combination with means mounting said trunnions and movable to slide said guides and shift said cylindrical member and holder.

In witness whereof I have hereunto set my hand.

RICHARD HERVIG.

Correction in Letters Patent No. 1,256,131.

It is hereby certified that in Letters Patent No. 1,256,131, granted February 12, 1918, upon the application of Richard Hervig, of Chicago, Illinois, for an improvement in "Lathe Attachments," an error appears in the printed specification requiring correction as follows: Page 5, line 100, claim 15, for the word "increasing" read *encasing;* and that the said Letters Patent should be read with this correction therein that the same may conform to the record of the case in the Patent Office.

Signed and sealed this 19th day of March, A. D., 1918.

[SEAL.]

R. F. WHITEHEAD,
*Acting Commissioner of Patents.*

Cl. 29—108.